US007024348B1

(12) United States Patent
Scholz et al.

(10) Patent No.: US 7,024,348 B1
(45) Date of Patent: Apr. 4, 2006

(54) DIALOGUE FLOW INTERPRETER DEVELOPMENT TOOL

(75) Inventors: Karl Wilmer Scholz, Strafford, PA (US); James S. Irwin, Stevens, PA (US); Samir Tamri, Frazer, PA (US)

(73) Assignee: Unisys Corporation, Blue Bell, PA (US)

( * ) Notice: Subject to any disclaimer, the term of this patent is extended or adjusted under 35 U.S.C. 154(b) by 786 days.

(21) Appl. No.: 09/702,224

(22) Filed: Oct. 31, 2000

Related U.S. Application Data

(60) Provisional application No. 60/236,360, filed on Sep. 28, 2000.

(51) Int. Cl.
*G06F 9/455* (2006.01)
*G10L 15/04* (2006.01)

(52) U.S. Cl. ........................ 703/24; 704/270; 704/275; 715/727

(58) Field of Classification Search .................... 703/1, 703/2, 23, 26, 24; 704/235, 251, 254, 256, 704/1, 275, 270, 274, 257; 715/727
See application file for complete search history.

(56) References Cited

U.S. PATENT DOCUMENTS 5,983,190 A * 11/1999 Trower et al. .............. 704/276
5,995,918 A 11/1999 Kendall et al. ............. 704/270
6,058,166 A * 5/2000 Osder et al. ............. 379/88.22
6,094,635 A 7/2000 Scholz et al. .................. 704/1
6,246,981 B1 * 6/2001 Papineni et al. ............ 704/235
6,321,198 B1 * 11/2001 Hank et al. ................. 704/270
6,510,411 B1 * 1/2003 Norton et al. .............. 704/254
6,513,009 B1 * 1/2003 Comerford et al. ......... 704/270
6,532,444 B1 * 3/2003 Weber ........................ 704/257
2002/0112081 A1 * 8/2002 Armstrong et al. ......... 709/246

OTHER PUBLICATIONS

Cover, Robin, Oasis The XML Cover pages "VoxML Markup Language", http://www.oasis-open.org/cover/voxML.html, Oct. 6, 1999, pp1-3.
Nuance Communications, "Nuance-SpeechObjects" http://www.nuance.com/index.htma 2000, pp. 1-2.
Nuance Communications, "Nuance SpeechObjects and V-Commerce Applications," 1999, pp. 1-13.

(Continued)

*Primary Examiner*—Thai Phan
(74) *Attorney, Agent, or Firm*—Lise A. Rode; Mark T. Starr; Woodcock Washburn

(57) ABSTRACT

A computer software product is used to create applications for enabling a dialogue between a human and a computer. The software product provides a programming tool that insulates software developers from time-consuming, technically-challenging programming tasks by enabling the developer to specify generalized instructions to a Dialogue Flow Interpreter, which invokes functions to implement a speech application, automatically populating a library with dialogue objects that are available to other applications. The speech applications created through the DFI may be implemented as COM (component object model) objects, and so the applications can be easily integrated into a variety of different platforms. In addition, "translator" object classes are provided to handle specific types of data, such as currency, numeric data, dates, times, string variables, etc. These translator object classes have utility either as part of the DFI library or as a sub-library separate from dialogue implementation.

6 Claims, 4 Drawing Sheets

OTHER PUBLICATIONS

Unisys Press Release, "New Version of Unisys Natural Language Speech Assistant Automates Creation of Speach-based Applications" http://www.speechdepot.com/PressReleases/991013__unisys__nlsa40.htm Oct. 13, 1999, pp 1-4.

Voice Processing Specialists, Webpage, http://www.vps-inc.com/, Oct. 26, 2000, pp 1-3.

VoiceXML Forum, "Voice eXtensible Markup Language VoiceXML" version 1, Mar. 7, 2000, pp. 1-101.

Hill, David R. and Irving, Graham, "The interactive Dialogue Driver: A Unit Tool", IPS Session '84, 1984, Dept. of Computer Science, The University of Calgary, Calgary, Alberta, Canada.

* cited by examiner

DFI Development Tool

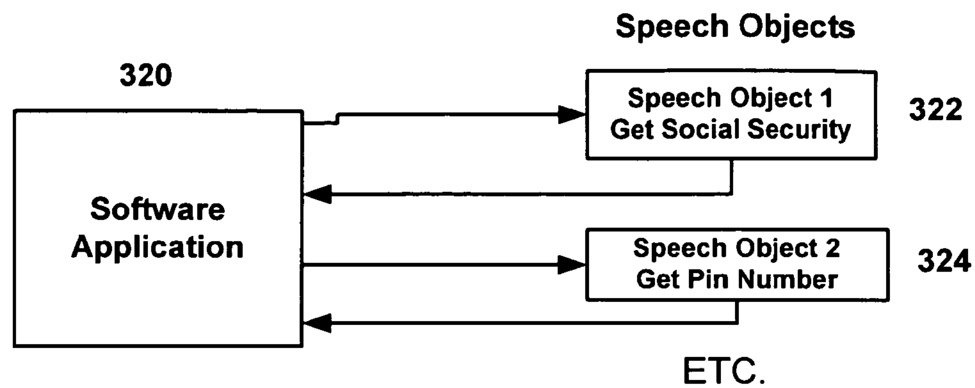
Figure 3 - Prior Art
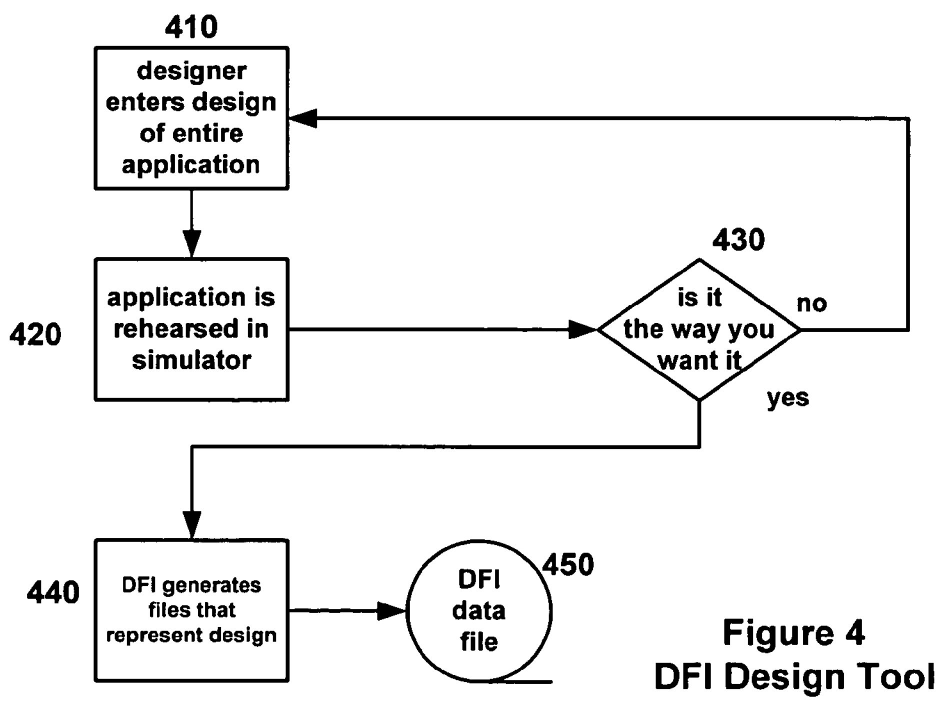
Figure 4
DFI Design Tool

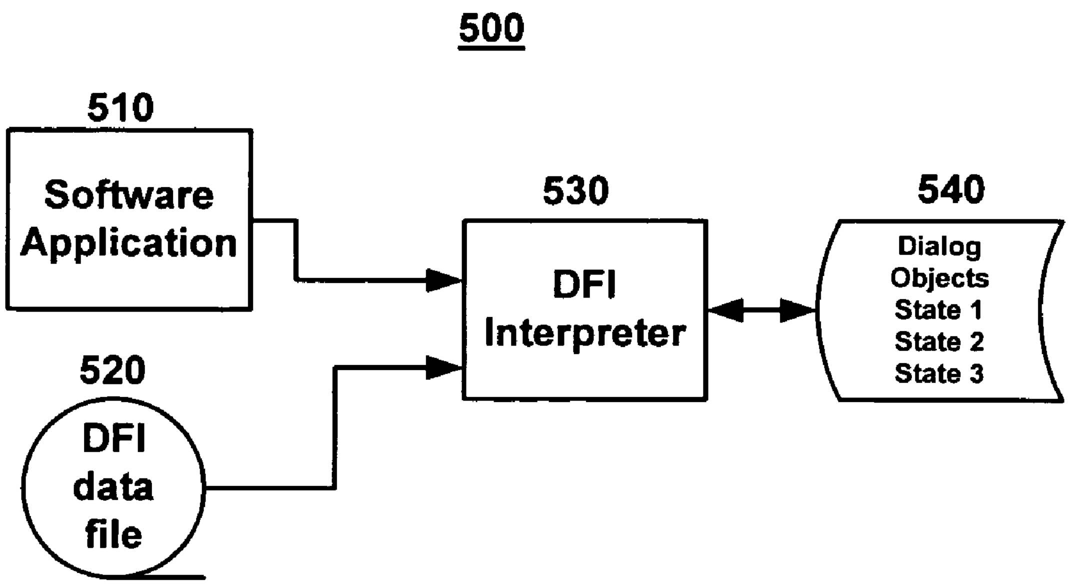
Figure 5
DFI
Figure 6(A) - Prior Art
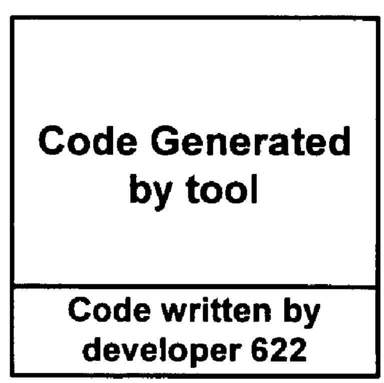
Figure 6(B) DFI Tool DFI Functions

DIALOGUE FLOW INTERPRETER DEVELOPMENT TOOL

CROSS-REFERENCE TO RELATED APPLICATIONS

The subject matter disclosed herein is related to the subject matter disclosed in U.S. Pat. No. 6,823,313, Nov. 23, 2004, "Methodology for Developing Interactive Systems," the contents of which are hereby incorporated by reference. In addition, we hereby claim the benefit of the priority date of U.S. Provisional Application No. 60/236,360, filed Sep. 28, 2000, "Dialog Flow Interpreter."

FIELD OF THE INVENTION

The present invention relates generally to speech-enabled interactive voice response (IVR) systems and similar systems involving a dialogue between a human and a computer. More particularly, the present invention provides a Dialogue Flow Interpreter Development Tool for implementing low-level details of dialogues, as well as translator object classes for handling specific types of data (e.g., currency, dates, string variables, etc.).

BACKGROUND OF THE INVENTION

Computers have become ubiquitous in our daily lives. Today, computers do much more than simply compute: supermarket scanners calculate our grocery bill while tracking store inventory; computerized telephone switching centers direct millions of calls; automatic teller machines (ATMs) allow people to conduct banking transactions from almost anywhere—the list goes on and on. For most people, it is hard to imagine a single day in which they will not interact with a computer in some way.

Formerly, computer users were forced to interact with computers on the computer's terms—by keyboard or mouse or more recently, by touch-tones on a telephone (called DTMF—for dual tone multi-frequency). More and more, however, the trend is to make interactions between computers easier and more user-friendly. One way to make interactions between computers and humans friendlier is to allow humans and computers to interact by spoken words.

To enable a dialogue between human and computer, the computer first needs a speech recognition capability to detect the spoken words and convert them into some form of computer readable data, such as simple text. Next the computer needs some way to analyze the computer-readable data and determine what those words, as they were used, meant. A high-level speech-activated, voice-activated, or natural language understanding application typically operates by conducting a step-by-step spoken dialogue between the user and the computer system hosting the application. Using conventional methods, the developer of such high-level applications specifies the source code implementing each possible dialogue, and each step of each dialogue. To implement a robust application, the developer anticipates and handles in software each possible user response to each possible prompt, whether such responses are expected or unexpected. The burden on the high-level developer to handle such low-level details is considerable.

As the demand for speech-enabled applications has increased, so has the demand on development resources. Presently, the demand for speech-enabled applications exceeds the development resources available to code the applications. Also, the demand for developers with the necessary expertise to write the applications exceeds the capacity of developers with that expertise. Hence, a need exists to simplify and expedite the process of developing interactive speech applications.

In addition to the length of time it takes to develop speech-enabled applications and the level of skill required to develop these systems, a further disadvantage of the present mode of speech-enabled application development is that it is vendor specific, significantly inhibiting reuse of the code if the vendor changes, and application specific, meaning that already written code can not be re-used for another application. Thus a need also exists to be able to create a system that is vendor-independent and code that is re-useable.

Additional background on IVR systems can be found in U.S. Pat. No. 6,094,635, Jul. 25, 2000, "System and Method for Speech Enabled Application"; in U.S. Pat. No. 5,995, 918, Nov. 30, 1999, "System and Method for Creating a Language Grammar using a Spreadsheet or Table Interface" and in U.S. Pat. No. 6,510,411, Jan. 21, 2003, "Task Oriented Dialog Model, and Manager."

SUMMARY OF THE INVENTION

The present invention relates to but is not necessarily limited to computer software products used to create applications for enabling a dialogue between a human and a computer. Such an application might be used in any industry (including use in banking, brokerage, or on the Internet, etc.) whereby a user conducts a dialogue with a computer, using, for example, a telephone, cell phone or microphone.

The present invention satisfies the aforementioned needs by providing a development tool that insulates software developers from time-consuming, technically-challenging development tasks by enabling the developer to specify generalized instructions to the Dialogue Flow Interpreter Development Tool, or DFI Tool. An application instantiates an object (i.e. the DFI object), the object then invoking functions to implement the speech application. The DFI Tool automatically populates a library with dialogue objects that are available to other applications.

The speech applications created through the DFI Tool may be implemented as COM (component object model) objects, and so the applications can be easily integrated into a variety of different platforms. A number of different speech recognition engines may also be supported. The particular speech recognition engine used in a particular application can be easily changed.

Another aspect of the present invention is the provision of "translator" object classes designed to handle specific types of data, such as currency, numeric data, dates, times, string variables, etc. These translator object classes may have utility either as part of the DFI library of objects described above for implementing dialogues or as a sub-library separate from dialogue implementation.

Other aspects of the present invention are described below.

BRIEF DESCRIPTION OF THE DRAWINGS

FIG. 3 is a flowchart depicting a prior art speech application.

FIG. 4 is a flowchart of a method according to the present invention for development of a design and the generation of a data file for a speech application.

FIG. 5 is a flowchart of a method according to the present invention for generation of a speech application.

FIGS. 6(*a*) and 6(*b*) provide a comparison of the amount of code written by a developer using a prior art system to that written by a developer using a system in accordance with the present invention.

DETAILED DESCRIPTION OF PREFERRED EMBODIMENTS

Overview

Figure 1:
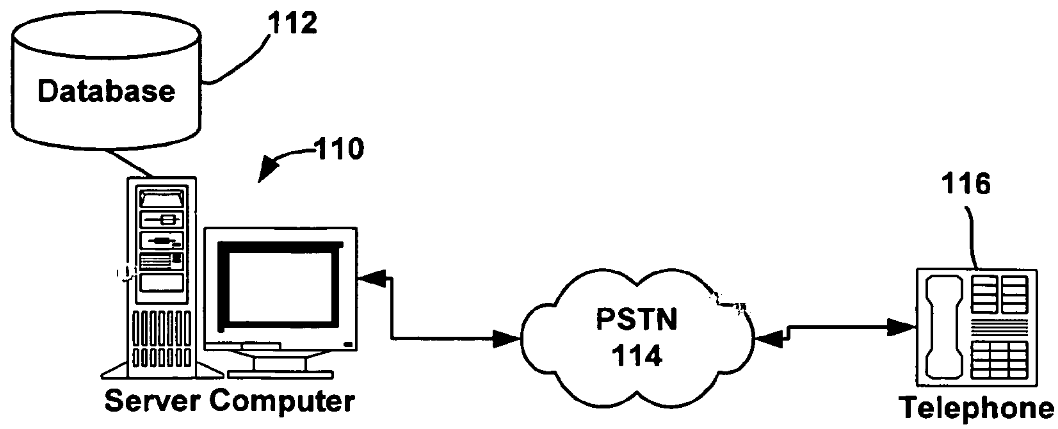
FIG. 1 schematically depicts a conventional IVR system.

FIG. 1 depicts a conventional IVR-type of system. In such a system, a person (not shown) communicates with a server computer, 110. The server computer, 110, is coupled to a database storage system, 112, which contains code and data for controlling the operation of the server computer, 110, in conducting a dialogue with the caller. As shown, the server computer, 110 is coupled to a public switched telephone network (PSTN), 114, which in turn provides access to callers via telephones, such as telephone, 116. As mentioned, such speech-enabled systems are used in a wide variety of applications, including voice mail, call centers, banking, etc.

Previously, speech application developers would choose a speech recognition engine and code an application-specific, speech recognition engine-specific system requiring the developer to handle each and every detail of the dialogue, anticipating and providing for the entire universe of possible events. Such applications would have to be completely rewritten for a new application or to use a different speech-recognition engine.

Figure 2:
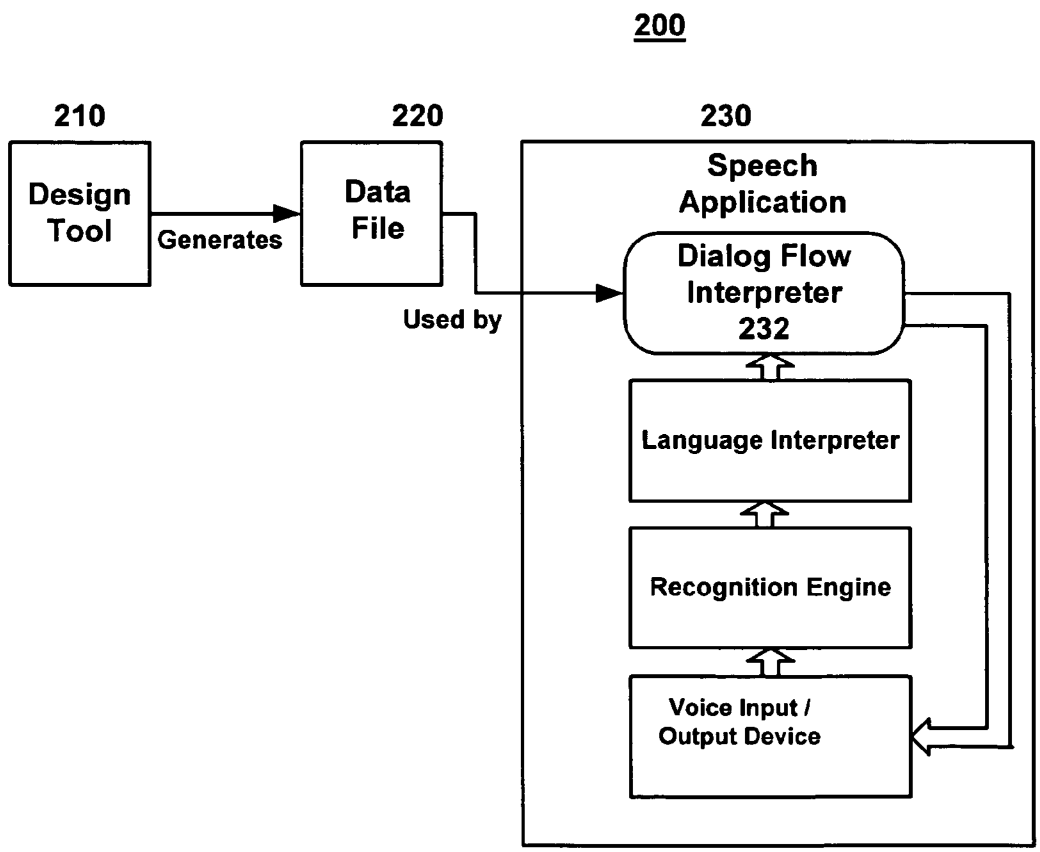
FIG. 2 is a flowchart of a method according to the present invention for development of a speech application.

In contrast to the prior art, and referring to FIG. 2, the present invention provides a system that insulates developers from time-consuming, low-level programming tasks by enabling the developer to specify generalized instructions about the flow of a conversation (potentially including many states or turns of a conversation), to a dialogue flow interpreter (DFI) design tool, 210, accessible through a programmer-friendly graphical interface (not shown). The DFI design tool, 210, produces a data file, 220, (a shell of the application). When the calling program (speech application), 230, which can be written by the developer in a variety of programming languages, executes, the calling program, 230, instantiates the dialogue flow interpreter, 232, providing to the interpreter, 232, the data file, 220, produced by the DFI design tool, 210. The dialogue flow interpreter, 232, then invokes functions of the DFI object to implement the speech application, providing all the details of state-handling and conversation flow that previously the programmer had to write. The calling program, 230, once written, can be used for different applications. Applications differ from one another in the content of prompts and expected responses and in resultant processing, (branches and conversation flow), and in the speech recognition engine used, all of which, according to the present invention, may be stored in the data file, 220. Therefore, by changing the data file, 220, the existing calling program, 230, can be used for different applications.

The development tool, 200, automatically saves reusable code of any level of detail, including dialogue objects, in a library that can be made accessible for use in other applications. A dialogue object is a collection of one or more dialogue states including the processing involved in linking the states together.

Because the speech applications created through the development programming tool are implemented as executable objects, the applications can be easily integrated into a variety of different platforms. A number of different speech recognition engines may be supported. The particular speech recognition engine used in a particular application can be easily changed. We will now explain the present invention in greater detail by way of comparing it with the prior art.

Prior Art

Referring again to FIG. 1, the most common ways for a user to communicate with a computer in a dialogue-based system is through a microphone or through a telephone, 116 connected by a telephone switching system, 114 to a computer on which the software enabling the human and computer to interact is stored in a database, 112. Each interaction between the computer and the user in which the computer tries to elicit a particular piece of information from the user is called a state or a turn. In each state the computer starts with a prompt and the user gives a spoken response. The application must recognize and interpret what the user has said, perform the appropriate action based on that response and then move the conversation to the next state or turn. The steps are as follows:

1. The computer issues a prompt.
2. The user (or caller) responds
3. The speech recognizer converts the response to computer-readable form.
4. The application interprets the response and acts accordingly. This may involve data base access for a query, for example.
5. The application may respond to the user.
6. Steps 1 through 5 may be repeated until a satisfactory response is received from the user.
7. The application transitions to the next state.

Hence a dialogue-based speech application includes a set of states that guide a user to his goal. Previously the developer had to code each step in the dialogue, coding for each possible event and each possible response in the universe of possible events, a time-consuming and technically-complex task. The developer had to choose an interactive voice response (IVR) system, such as Parity, for example, and code the application in the programming language associated with that language, using a speech recognition engine such as Nuance, Lernout and Hauspie or another speech recognition engine that would plug into the IVR environment.

Speech objects are commercially available. Referring to FIG. 3, speech objects, 322, 324 are pre-packaged bits of all the things that go into a speech act, typically, a prompt, a grammar, and a response. In this scheme, a speech object, for example, Get Social Security Number, 322, is purchased from a vendor. A developer writes software code, 320, in the programming language required for the speech objects chosen, and places the purchased Get Social Security Number speech object, 322, into his software. When the program executes and reaches a point where the social security number is required, the Get Social Security Number speech object, 322, is invoked. The application may have changed slightly how the question was asked, but the range of flexibility of the speech object is limited. After the response from the user is obtained, control is returned to the application, 320. The application, 320, written by the developer, then must handle the transition to the next state, Get PIN Number, 324, and so on. Speech objects are implemented to a specific deployment system (e.g. Nuance's "IVR system" called Speech Channels, and SpeechWorks' "IVR system" referred to as an application framework). These reusable pieces are only reusable within the environment for which they were built. For example, a SpeechWorks implementation of this, called Dialog Modules, will only work within the SpeechWorks application framework.) The core logic is not reusable because it is tied to the implementation platform.

DFI Design Tool

In contrast, in accordance with the present invention, referring to FIG. 4, the developer would use the DFI design tool, 400, to enter a design of the whole application, as depicted in step 410, including many such states such as Get Social Security Number, Get PIN Number and so on. Once the application is rehearsed in the simulator (see U.S. Pat. No. 6,823,313), step 420, files may be generated that represent that design, steps 440 and 450.

As shown in FIG. 5, the software application, 510, coded by the developer in any of a variety of programming languages, instantiates the dialogue flow interpreter, 530, and tells it to interpret the design specified in the file, 520, generated above by the DFI design tool. The dialogue flow interpreter, 530, controls the flow through the application, supplying all the underlying code, 540, that previously the developer would have had to write.

As can be seen from FIG. 6A, 612 and FIG. 6B, 622, the amount of code having to be written by a programmer is substantially reduced. Indeed, in some applications it can be entirely eliminated.

Dialogue Flow Interpreter

The Dialogue Flow Interpreter, or DFI, of the present invention provides a library of "standardized" objects that implement low-level details of dialogues. The DFI may be implemented as an application programming interface (API) that simplifies the implementation of speech applications. The speech applications may be designed using a tool referred to as the DFI Development Tool. The simplification provided by the invention comes from the fact that the DFI is able to drive the entire dialogue of a speech application from start to finish automatically, thus eliminating the crucial and often complex task of dialogue management. Traditionally, such a process is application dependent and therefore requires re-implementation for each new application. The DFI solves this problem by providing a write-once, run-many approach.

FIG. 2 illustrates the relationship between the DFI Design Tool, 210, the Dialogue Flow Interpreter, 232, and other speech application components. (In this diagram, block arrows illustrate the direction of data flow.)

Functional Elements

A speech application includes a series of transitions between states. Each state has its own set of properties that include the prompt to be played, the speech recognizer's grammar to be loaded (to listen for what the user of the voice system might say), the reply to a caller's response, and actions to take based on each response. The DFI keeps track of the state of the dialogue at any given time throughout the life of the application, and exposes functions to access state properties.

Figure 7:
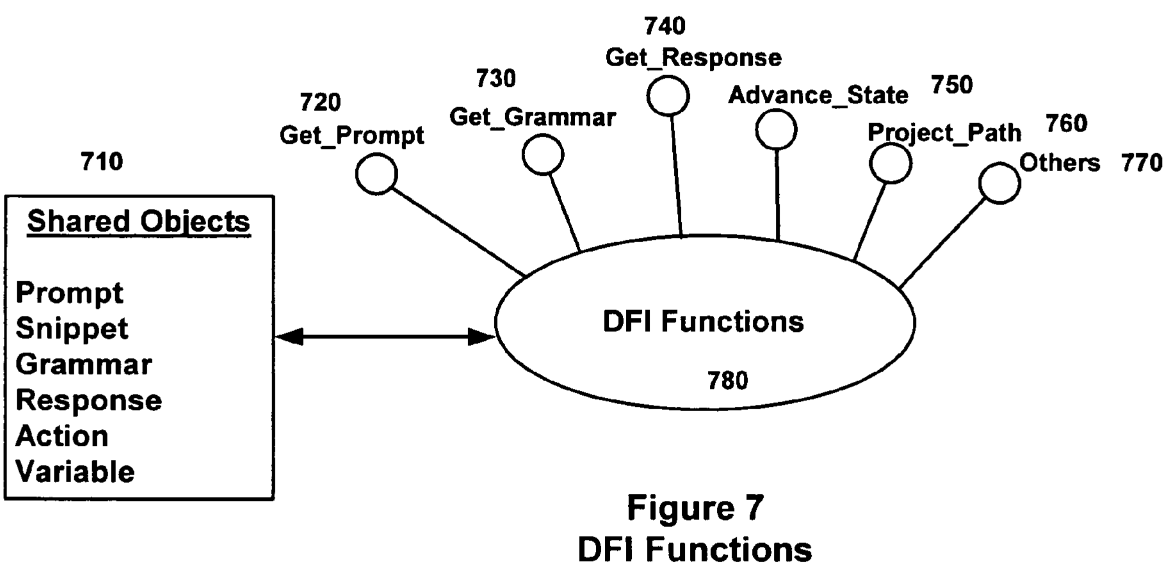
FIG. 7 is a schematic diagram representing functions and shared objects in accordance with the present invention.

Referring to FIG. 7, it can be seen that state properties are stored in objects called "shared objects", 710. Examples of these objects include but are not limited to, a Prompt object, a Snippet object, a Grammar object, a Response object, an Action object, and a Variable object.

Exemplary DFI functions, 780, return some of the objects described above. These functions include:

GET-PROMPT, 720: Returns the appropriate prompt to play. This prompt is then passed to the appropriate sound playing routine for sound output.

GET GRAMMAR, 730: Returns the appropriate grammar for the current state. This grammar is then loaded into the speech recognition engine.

GET RESPONSE, 740: Returns a response object comprised of the actual user response, any variables that this response may contain, and all possible actions defined for this response ADVANCE-STATE, 750: Transitions the dialogue to the next state.

Other DFI functions are used to retrieve state-independent properties (i.e., global project properties). These include but are not limited to:

Project's path, 760

Project's sounds path

Input Mode (DTMF or Voice)

Barge-in Mode (DTMF or Voice)

Current State

Previous State

DFI Alternative Uses

Logging device for dialogue metrics—Because the DFI controls the internals of transitioning between states, it would be a simple matter to count how many times a certain state was entered, for example, so that statistics concerning how a speech application is used or how a speech application operates, may be collected.

Speech application stress tester—Because the DFI controls the internals of transitioning between states, the DFI Tool enables the development of a application (using text to speech) that would facilitate the testing of speech applications by providing the human side of the dialogue in addition to the computer-side of the dialogue.

FIG. 7 illustrates how the DFI functions 780 may be implemented or viewed as an applications programming interface (API).

Comparison of DFI to Speech Objects

Speech Objects (a common concept in the industry) represent prepackaged bits of all the things that go into a "speech act," typically, a prompt (something to say), a grammar (something to listen for) and perhaps some sort of reaction on the part of the system. This might cover the gathering of a single bit of information (which seems simple until you consider everything that could go wrong). One approach is to offer pre-packaged functionally (e.g., SpeechWorks (www.speechworks.com)). An example of the basic model is as follows: The designer buys (e.g., from Nuance) a speech object called Get Social Security Number and puts it into his program. When the program reaches a point where a user's social security number is needed, the designer invokes the Get Social Security Number object. The application may have altered it a bit by changing exactly how the question is asked or extending the range of what it will hear, but the basic value is the prepackaged methodology and pre-tuned functionality of the object.

In the Dialogue Flow Interpreter Development Tool of the present invention, the designer would use a design tool (say, the DFI tool offered by Unisys Corp.) to enter a design of the whole application (potentially including many states such as getting SS# and getting PIN and so on). Once this application is rehearsed in a simulator (Wizard of Oz tester), files are generated that represent that design (e.g., MySpeechApp). The DFI is instantiated by the "runtime" application (written in some programming language) and told to interpret the design (MySpeechApp) produced by the design tool. Once set up, the application code need only give the DFI the details of what is going on to "read back" the design for what to do next. So, for example, the designer may indicate a sequence such as:

What is your SS Number?
(listen for SS Number)
What is your PIN
(listen for PIN)
Do you want to order or report a problem
(listen for ORDER or REPORT A PROBLEM)
if ORDER then
  What is your order . . .
else if REPORT A PROBLEM then
  What is your problem . . .

In this case, the DFI would first enter a state where, when the program asked what prompt to play, it would return "What is your SS Number?," and indicate that the program should listen for the SS#. Once the application told the DFI this had been accomplished and to move on, the application would again ask the DFI what to say and it would now return "What is your PIN". The DFI would continue supplying directional data until the application ended. The point is that the DFI supplies the "internals" for each turn of the dialogue (prompt, what to listen for, etc) as well as the flow through the application.

Although they address similar problems, the DFI is very different from the Speech Objects model. Speech Objects set up defaults a program can override (the program has to know this from somewhere) whereas DFI provides the application with what to do next. Speech Objects are rigid and preprogrammed and of limited scope, whereas the DFI is built for a whole application and is dynamic. Speech Objects are "tuned" for a special purpose. This tuning may be provided through the DFI design tool, as well. Another way to think of the difference is that the DFI delivers "custom" speech capabilities built through the tool, including how they "link" together. Speech Objects provide "prepackaged" capabilities (with the advantage of "expert design" and tuning) and with no "flow" between them.

Translator Object Classes

A speech application needs to be able to retrieve information in a form that the software can interpret. Once the information is obtained, it may be desirable to output that information in a particular speech format to the outside world. In accordance with the present invention, translator object classes enable a developer to provide parameters to specify details about how a particular piece of information should be output and the DFI will return everything necessary to perform that task. For example, when the desired object is to output what time it is presently in Belgium in English in standard time, the developer would specify the language (English), the region (Belgium), the time (the time right now in Belgium) and the format (standard time), and the DFI will return a play list of everything required to enable the listener to hear the data structure with those characteristics (the time in Belgium right now in standard format, spoken in English.)

For example, when the DFI is completing the prompting, the DFI would access the function GET PROMPT, FIG. 7, 720, which would return, (when the output speech is a recorded file):

1. the "It is now".wav file,
2. the value of the time instance (variable), 12:35 pm: and the associated files:

twelve.wav
thirty.wav
five.wav
pm.wav, 3. and the "in Belgium".wav file.

The listener would hear: "It is now twelve thirty-five pm in Belgium." It should be understood that the above example is for exemplary purposes only. The present invention also includes text-to-speech (computer-generated) speech output.

Alternately, if the developer wanted to use the object directly in his application, without using the DFI, the application could access the translator directly. The translator would return the value of the time instance (12:35) and the associated files:

twelve.wav
thirty.wav
five.wav
pm.wav. Thus the translator object classes contain objects that can be used by the speech application written by the developer or by the DFI.

Although commercially available speech objects may provide similar functionality, the inventiveness of translator object classes lies in that the developer does not lose control of the low-level details of the way the information is output because the developer can write his own objects to add to the class. When a developer uses commercially available speech objects, the developer must accept the loss of flexibility to control the way the speech object works. With translator objects according to the present invention, the developer maintains control of the low-level details while still obtaining the maximum amount of automation.

CONCLUSION

In sum, the present invention provides system and methods to create interactive dialogues between a human and a computer, such as in an IVR system or the like. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention. For example, the present invention may support non-speech-enabled applications in which a computer and a human interact. The present invention will allow the recall of a textual description of a prompt which may be displayed textually, the user responding by typing into an edit box. In other words, it is the dialogue flow and properties of each state that is the core of the invention, not the realization of the dialog. Such an embodiment may be utilized in a computer game or within software that collects configuration information, or in an Internet application which is more interactive than simple graphical user interface (GUI) techniques enable.

It should also be noted that the present invention may be implemented in a variety of computer environments. For example, the present invention may be implemented in Java, enabling direct access from any Java programming language. Additionally, the implementation may be wrapped by a COM layer, allowing any language which supports COM to access the functions, thus enabling traditional development environments such as Visual Basic, C/C++, etc. to use the present invention. The present invention may also be accessible from inside Microsoft applications, including but not limited to Word, Excel, etc. through, for example, Visual Basic for Applications (VBA). Traditional DTMF-oriented systems, such as Parity, for example, which are commercially available, may embed the present invention into their platform. The present invention and its related objects may also be deployed in development environments for the world wide web and Internet, enabling hypertext markup language (HTML) and similar protocols to access the DFI development tool and its objects.

The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

We claim:

1. A method of developing a dialogue-enabled application for executing on a computer that enables a human and a computer to interact, comprising the acts of:

(a) inputting instructions specifying the flow of a conversation to a design tool, said design tool producing a data file, said data file containing information relating to prompts, responses, branches and conversation flow for implementing a programmer-defined human-computer speech-enable interaction; and (b) instantiating an interpreter object within an application, the interpreter object interpreting the data file to provide the programmer-defined human-computer dialogue-enabled interaction defined by the data file.

2. The method of claim 1 wherein said data file further contains information concerning a speech recognition engine.

3. The method of claim 1 wherein said data file is automatically stored.

4. The method of claim 1 wherein said inputting of instruction takes place through a graphical interface.

5. A dialogue flow interpreter (DFI) for use in computer-implemented system for carrying out a dialogue between a human and a computer, wherein the DFI comprises computer executable instructions for reading a data file containing programmer-predefined information concerning prompts, responses, branches and conversation flow for implementing a human-computer dialogue, and computer executable code for using said information in combination with a library of shared objects to conduct said dialogue.

6. A DFI as recited in claim 5, wherein the DFI is implemented in an application comprising, in addition to the DFI, a language interpreter, recognition engine, and voice input/output device.

* * * * *